April 16, 1963  J. H. KRONHEIM  3,085,599
APPARATUS FOR HANDLING FLUID UNDER PRESSURE
Filed Sept. 12, 1961  3 Sheets-Sheet 2
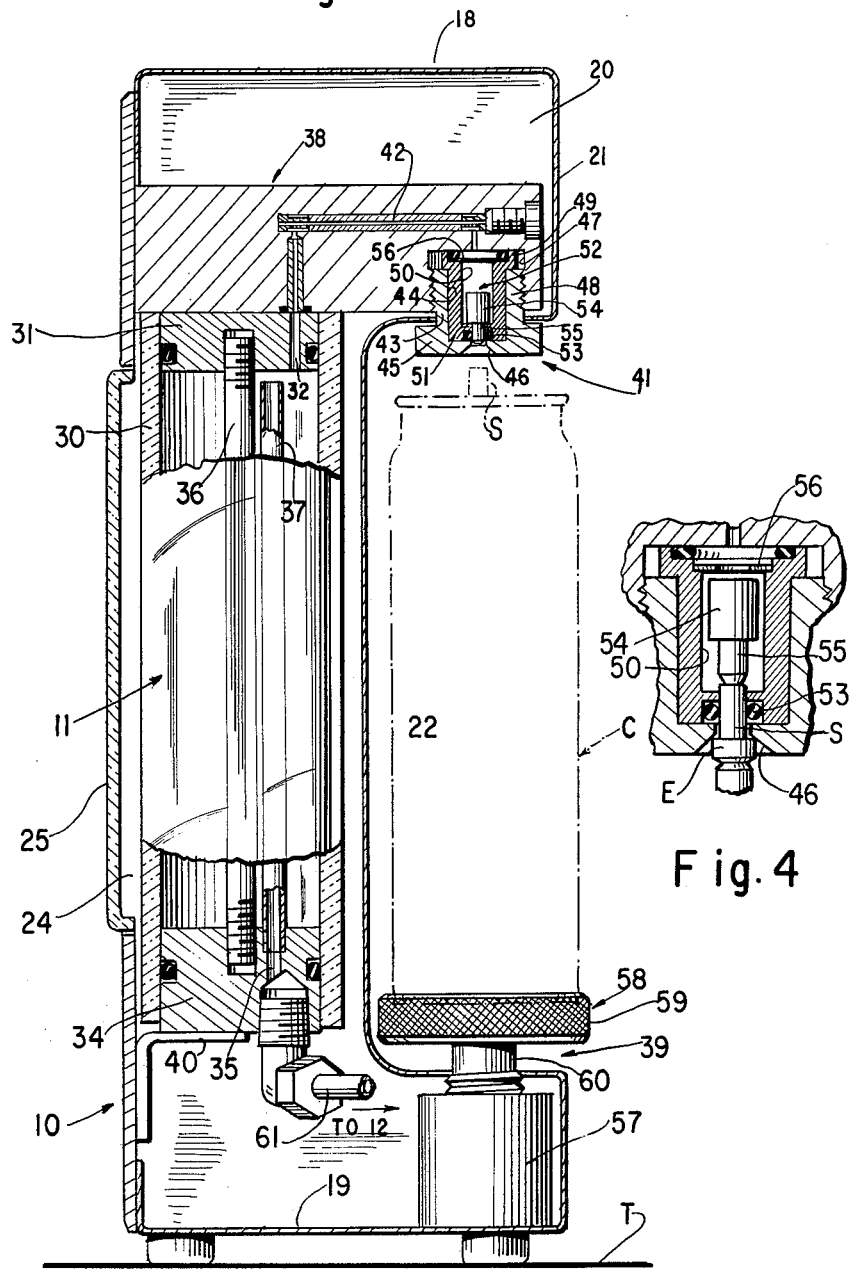
INVENTOR
JOHN H KRONHEIM
BY
J. William Carem
ATTORNEY

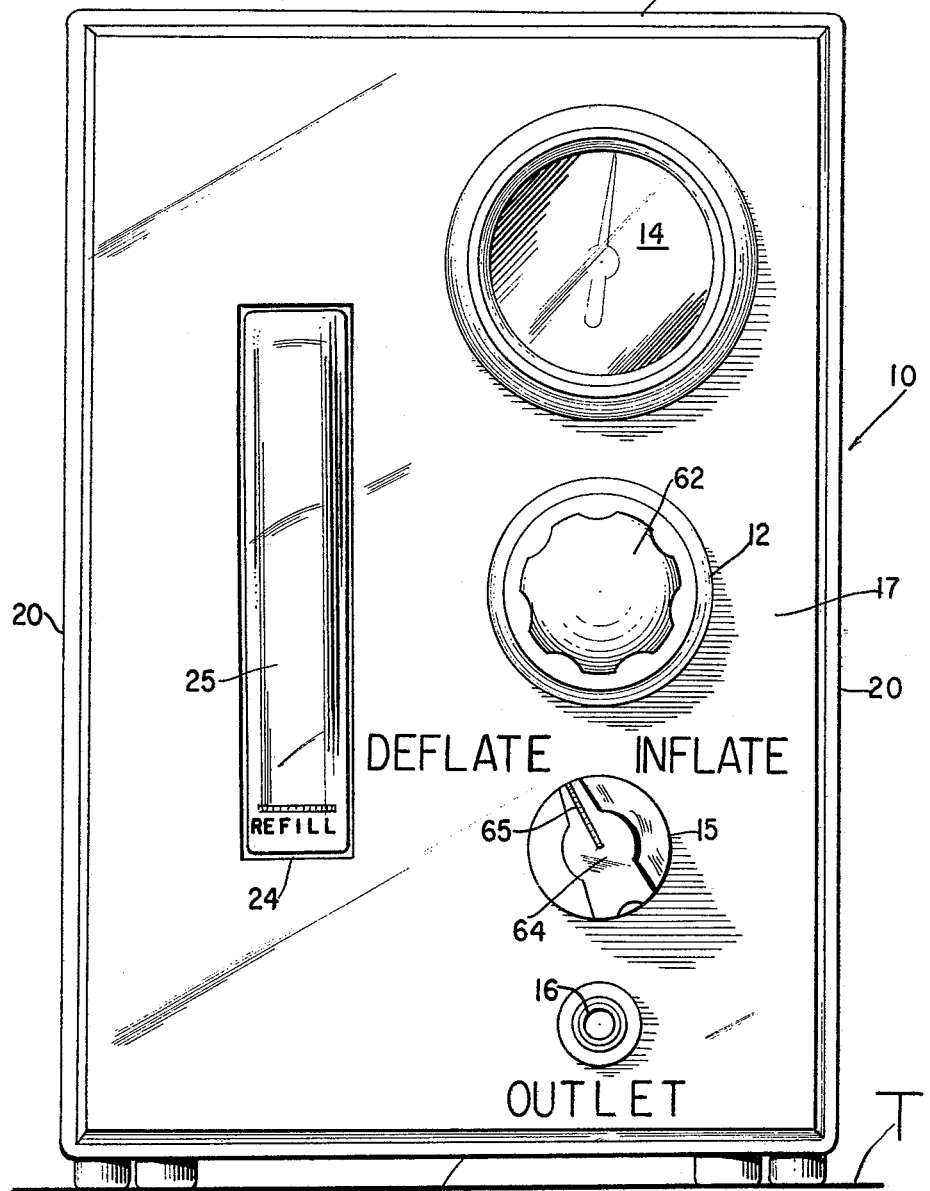

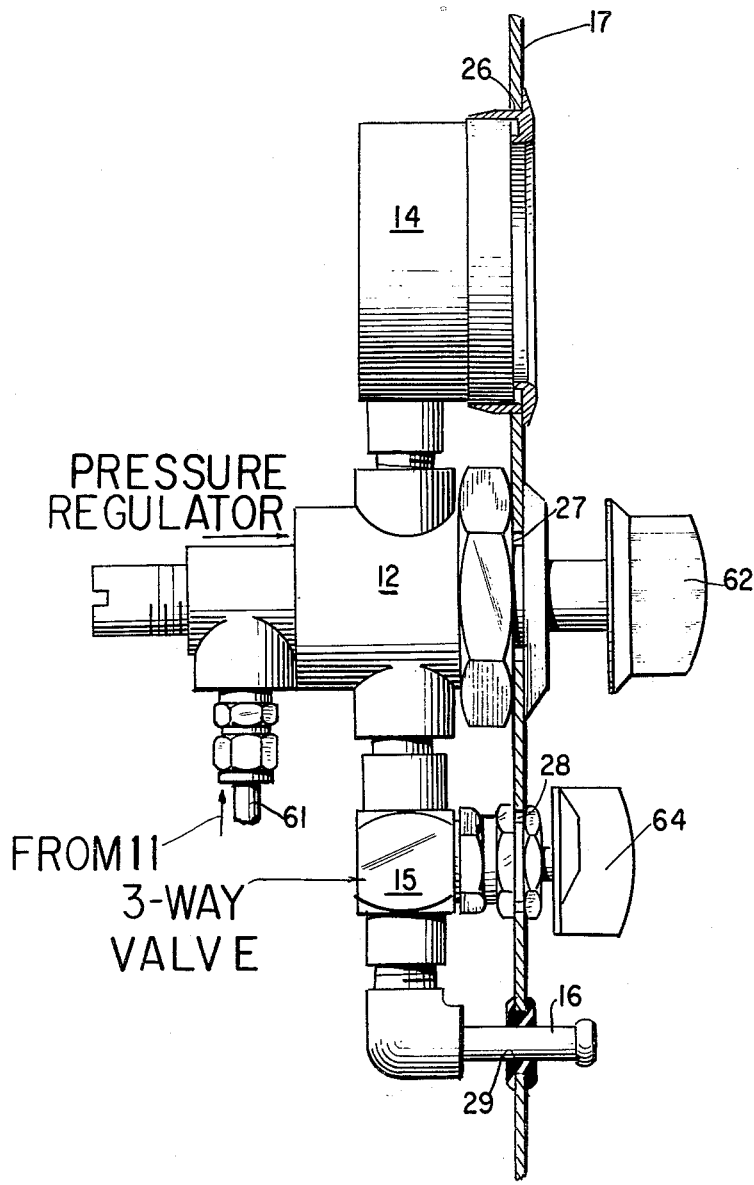

United States Patent Office 3,085,599
Patented Apr. 16, 1963

3,085,599
APPARATUS FOR HANDLING FLUID UNDER PRESSURE
John H. Kronheim, East Orange, N.J., assignor to Kidde Manufacturing Co., Inc., Bloomfield, N.J., a corporation of New Jersey
Filed Sept. 12, 1961, Ser. No. 137,555
5 Claims. (Cl. 141—18)

The present invention relates to apparatus for handling fluid under pressure, and, more particularly, to such apparatus wherein provision is made for transferring the fluid from a container for confining the fluid to a reservoir and dispensing the fluid in a controlled manner from the reservoir to a point of use.

The apparatus in accordance with the present invention is primarily adapted for pressurizing and inflating devices used in the medical profession such as fluid pressure actuated tourniquet cuffs or body lifters for facilitating the placement of a bedpan under a bedridden pateint.

While in the past such devices have been inflated by directly attaching a container such as a conventional aerosol can which confines the inflating medium to the devices, this is not entirely satisfactory because the quantity of the medium remaining in the can is never known by the operator. Consequently, the contents may be exhausted while attempting to inflat a device and the inflation must be discontinued and started again with a full container. This of course wastes valuable time and is annoying to both the operator and the patient.

Accordingly, an object of the present invention is to provide apparatus in the form of an attractive and compact unit which enables the fluid under pressure to be readily transferred from an expendable can to a transparent reservoir adapted to indicate the amount of fluid therein so that the reservoir can be refilled with a fresh can before the contents of the reservoir are depleted.

Another object is to provide such apparatus wherein the fluid is dispensed at a desired controlled pressure to prevent damage to the inflatable devices by excessive pressure.

Another object is to provide such apparatus wherein the fluid under pressure is confined in the reservoir in a manner to prevent leakage losses during replenishing of the contents of the reservoir.

A further object is to provide such apparatus which is constructed in a simple and economical manner and is accurate and reliable in operation.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description, and is shown in the accompanying drawings, forming a part of the specification, wherein:

FIG. 1 is a front elevational view of apparatus in accordance with the present invention.

FIG. 2 is a sectional view taken along the line 2—2 on FIG. 1.

FIG. 3 is a sectional view taken along the line 3—3 on FIG. 1.

FIG. 4 is an enlarged fragmentary sectional view of mens for opening a valved outlet of a container which confines the inflating medium.

Referring now to the drawings in detail, there is shown apparatus which generally comprises a casing or cabinet 10, a reservoir 11 for fluid under pressure, means for mounting a container C having fluid under pressure stored therein and for transferring the contents thereof to the reservoir, and passageway means for conducting the fluid from the reservoir to a point of use including a pressure regulator 12 equipped with a pressure gauge 14, a three-way valve 15 connected downstream of the pressure gauge, and an outlet tube 16 connected downstream of the valve 15.

The casing 10 preferably is rectangular and is adapted to be positioned upright on a table T or other suitable support. The casing comprises a front panel 17 top, bottom and side walls, 18, 19 and 20 respectively, and a rear wall 21 formed with a niche 22 for receiving the container C (FIG. 2).

The front panel 17 has an upright elongate sight opening 24 at one side thereof preferably provided with a window 25 (FIGS. 1 and 2), and has an opening 26 for mounting the gauge 14, an opening 27 for mounting the pressure regulator 12, an opening 28 for mounting the valve 15 and an opening 29 through which the tube 16 extends. The openings 26 to 29 are in vertical alignment and are arranged in the order named from top to bottom at one side of the sight opening 24.

The reservoir 11 comprises a transparent open ended cylinder 30 positioned adjacent the sight opening 24, a wall member 31 for sealing the upper end of the cylinder formed with an inlet 32, a wall member 34 for sealing the lower end of the cylinder formed with an outlet 35, and a stay rod 36 within the cylinder having its ends secured to the wall members 31 and 34. In the event the fluid medium is of the type which is confined under pressure as a liquid and vaporizes when the pressure is reduced, such as dichlorodifluoromethane (Freon 12, Halon 122), an upright tube 37 is mounted within the cylinder, with its lower end secured to the bottom wall member over the outlet 35 and its open upper end above the liquid level of the fluid in the cylinder so as to conduct vaporized or gaseous medium to the outlet 35.

The container C shown herein is a conventional aerosol dispensing can having a valved outlet at its upper end including a tubular stem S adapted to be depressed to operate the container valve and cause fluid in the container to be discharged through its open upper end. As shown in FIG. 4, the stem S has an enlarged portion E below its upper end for the purpose described hereinafter. In the event the fluid under pressure is of the vaporizable liquid type as already indicated, the can is equipped with a syphon tube which extends from the valved outlet to the bottom of the can so as to discharge the fluid in liquid state.

The container mounting and fluid transferring means comprise a horizontal block 38 secured to the inner wall of the front panel 17 adjacent the upper end of the casing 10, and an assembly 39 secured to the bottom wall 19 of the casing for manipulating the container to effect discharge of its contents as described hereinafter.

The reservoir 11 has its upper end positioned against the underside of the block and has its lower end supported on a bracket 40 to maintain the reservoir in this position. The block 38 has an assembly 41 secured therein above the niche 22 for confining and effecting actuation of the container stem S (FIG. 4) to discharge fluid from the container and receiving the discharged fluid, and has a passageway 42 therein for conducting the discharge fluid from the assembly 41 to the inlet 32 of the reservoir 11.

The assembly 41 (FIG. 2) comprises a sleeve 43 formed with a bore 44 and a head 45 having a downwardly flared opening 46 therein in central alignment with the bore 44, the sleeve being screwed into a bore 47 extending upwardly within the block 38 and communicating with the passageway 42, a sleeve 48 fitting into the bore 44 of the sleeve 43 and having a flange 49 overlying the upper end of the sleeve 43 and having a stepped bore 50 including an annular seat 51 defining a recess above the upper end of the opening 46 for the reception of an O-ring 53, a slidable check valve member 52 in the bore 50 having a head 54 fitting loosely in the bore 50 and adapted to engage the seat 51 and having a depending stem 55 extending through the O-ring and into the upper end of the opening 46 when the head 54 is on its seat, and a washer 56 secured within the bore 50 adjacent its upper end for retaining the valve member 52 within the bore 50. When the sleeve 43 is screwed into the bore 47 of the block 38, the upper face of the flange 49 abuts the end wall of the bore 47 to fix the sleeve 48 in the bore 44 of the sleeve 43.

The assembly 39 (FIG. 2) comprises a block 57 secured to the bottom wall 19 of the casing 10 and having a threaded vertical bore, and a member 58 having a dished platform or head 59 for receiving and supporting the bottom of the container to align the same with the assembly 41 and having a screw threaded depending stem 60 cooperating with the bore of the block 57 to effect upward and downward movement of the platform 59 upon turning the member 58.

The outlet 35 of the reservoir 11 is connected to the inlet of the pressure regulator 12 by a conduit 61 (FIGS. 2 and 3), the outlet of the pressure regulator is connected to the inlet of the three-way valve 15, the tube 16 is connected to one of the outlets of the three-way valve, and a hose (not shown) is adapted to be attached to the tube 16 to conduct the fluid under pressure to its point of use such as an inflatable device (not shown). The three-way valve has a second outlet which communicates with the atmosphere and is arranged so that in one position communication between the valve inlet and the inflatable device is established to inflate the device and to shut off the outlet to atmosphere, and so that in its other position communication between the device and the valve outlet to atmosphere is established to deflate the device and shut off the valve inlet.

The pressure regulator 12 is provided with a manually operable knob or handle 62 at the exterior of the casing 10 for adjusting the pressure of the fluid to be supplied; and the valve 15 is provided with a manually operable knob or handle 64 at the exterior of the casing 10 having a pointer 65 adapted to cooperate with indicia on the front panel 17 for indicating the position of the valve (FIGS. 1 and 3).

In operation of the apparatus with the reservoir empty, the platform 59 is lowered to receive the bottom of the container C and to allow the container to be placed in the niche with the upper end of the stem S in the opening 46, and the platform is raised to elevate the container. This causes the upper portion of the stem S to engage the stem 55 of the valve member 52 and unseat the valve member 52, and to extend through the O-ring 53 in sealing engagement therewith (FIG. 4); and causes the enlarged portion E to engage the wall portion of the head 45 at the opening 46, whereby the stem S is depressed and the container valve is opened to discharge fluid therefrom by way of the open upper end of the stem S. The fluid so discharged moves the valve member 52 upwardly so that the fluid passes between the head 54 and the wall defining the bore 50 and flows through the passageway 42, to the inlet 32 and into the reservoir 11.

When the fluid in the container has been so transferred, the apparatus is ready for use. In use with the pressure regulator adjusted to conduct fluid at the desired pressure, the device to be inflated is connected to the outlet tube 16 and the three-way valve 15 is manipulated to effect inflation and deflation in the manner already indicated herein.

When the level of the liquid in the reservoir 11 approaches the "refill" indicia (FIG. 1), the platform 59 is lowered to enable the empty container C to be removed whereupon the valve member 52 is returned to its seated position (FIG. 2) by the pressure of the fluid in the reservoir and prevents leakage of fluid through the opening 46. A full container C is then inserted and discharged into the reservoir in the same manner as described hereinbefore.

From the foregoing description, it will be seen that the present invention provides simple, compact, economical and reliable apparatus of the general type described herein which gives a visible indication that the liquid in the reservoir should be replenished before an inflating operation is started which might be interrupted because of insufficient fluid being available.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:
1. Apparatus for transferring and dispensing fluid under pressure comprising a casing having a front panel provided with a sight opening, a transparent reservoir mounted in said casing adjacent said sight opening to render the contents of said reservoir visible from the exterior of said casing, said reservoir having an inlet at its upper end and an outlet at its lower end, means on said casing at the back thereof and adjacent said reservoir for mounting a container having fluid under pressure stored therein and provided at one end with a valved outlet including a tubular stem, said means including a tubular element for receiving and engaging the stem of the valved outlet of the container, a conduit for establishing fluid flow communication between said element and said reservoir inlet and a member for urging the other end of the container in a direction to cause said element to effect opening of the valved outlet of the container, a passageway for conducting fluid under pressure from said reservoir to a point of use, and valve means in said passageway for controlling the flow of fluid therethrough.

2. Apparatus according to claim 1, wherein said tubular element is provided with a check valve which is constructed and arranged to be unseated by the valved outlet of the container before said element effects opening of the valved outlet.

3. Apparatus according to claim 1, wherein a member having a threaded bore is secured within said casing and said container urging member has a shank screw threaded into said bore for effecting upward and downward movement of said urging member.

4. Apparatus according to claim 1, wherein said valve means includes a pressure regulator and a three-way valve, and said pressure regulator and said three-way valve have manually operable means at said front panel.

5. Apparatus according to claim 4, including a hose attaching tube connected to the outlet of said three-way valve and extending through said front panel, and a pressure gauge connected to said regulator, said gauge, manually operable means of said pressure regulator, said manually operable means of said three-way valve, and said tube being in vertical alignment on said front panel in the order named.

No references cited.